(12) United States Patent
Ueda et al.

(10) Patent No.: US 11,939,879 B2
(45) Date of Patent: Mar. 26, 2024

(54) BLADE REPAIR METHOD, BLADE, AND GAS TURBINE

(71) Applicant: MITSUBISHI HEAVY INDUSTRIES, LTD., Tokyo (JP)

(72) Inventors: Osamu Ueda, Yokohama (JP); Hiroshi Murai, Yokohama (JP); Ryoji Fushino, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 49 days.

(21) Appl. No.: 17/786,836

(22) PCT Filed: Dec. 17, 2020

(86) PCT No.: PCT/JP2020/047134
§ 371 (c)(1),
(2) Date: Jun. 17, 2022

(87) PCT Pub. No.: WO2021/132012
PCT Pub. Date: Jul. 1, 2021

(65) Prior Publication Data
US 2023/0025087 A1    Jan. 26, 2023

(30) Foreign Application Priority Data

Dec. 23, 2019   (JP) ................................. 2019-231773

(51) Int. Cl.
*F01D 5/00*       (2006.01)
*B23K 35/30*    (2006.01)
(Continued)

(52) U.S. Cl.
CPC .............. *F01D 5/005* (2013.01); *B23K 35/30* (2013.01); *F01D 5/14* (2013.01); *F01D 9/041* (2013.01);
(Continued)

(58) Field of Classification Search
CPC ........ B23P 6/007; B23P 6/045; B23K 10/027; B23K 11/0013
See application file for complete search history.

(56) References Cited

U.S. PATENT DOCUMENTS 11,135,677 B2 *  10/2021  Mangano ................ F01D 5/005
2005/0067466 A1   3/2005  Boegli et al.
(Continued)

FOREIGN PATENT DOCUMENTS

JP   2008-229719    10/2008
JP   2009-285664    12/2009
(Continued)

OTHER PUBLICATIONS

International Search Report dated Feb. 2, 2021 in International Application No. PCT/JP2020/047134, with Machine Translation.
Written Opinion of the International Searching Authority dated Feb. 2, 2021 in International Application No. PCT/JP2020/047134, With Machine Translation.

*Primary Examiner* — Courtney D Heinle
*Assistant Examiner* — Danielle M. Christensen
(74) *Attorney, Agent, or Firm* — Wenderoth, Lind & Ponack, L.L.P.

(57) ABSTRACT

This blade repair method has: a first welding step in which overlay welding in which a first welding material is used is performed to form a notched part and a bury a first region positioned on a blade-body side with a first welding material; and a second welding step in which, after the first welding step, overlay welding in which a second welding material is used is performed to form a notched part and bury a second region positioned on a front-surface side of a platform with the second welding material. The high-temperature strength of the second welding material is higher than the high-temperature strength of the first welding material, the weldability of the first welding material is higher than the weldability of the second welding material, (Continued)

and the second region is located in a range from 1.0 mm to 3.0 mm (inclusive) from the front surface of the platform toward the blade body.

7 Claims, 10 Drawing Sheets

(51) Int. Cl.
*F01D 5/14* (2006.01)
*F01D 9/04* (2006.01)

(52) U.S. Cl.
CPC ...... *F05D 2220/32* (2013.01); *F05D 2230/80* (2013.01); *F05D 2240/12* (2013.01); *F05D 2240/30* (2013.01)

(56) References Cited

U.S. PATENT DOCUMENTS

| | | |
|---|---|---|
| 2008/0230156 A1 | 9/2008 | Abriles et al. |
| 2011/0088260 A1 | 4/2011 | Yoshioka et al. |
| 2015/0165569 A1* | 6/2015 | Georgieva .............. F01D 5/005 228/119 |

FOREIGN PATENT DOCUMENTS

| | | |
|---|---|---|
| JP | 2011-136344 | 7/2011 |
| JP | 2012-020308 | 2/2012 |
| JP | 2018-150814 | 9/2018 |
| WO | WO-2017021532 A1 * | 2/2017 |

* cited by examiner

BLADE REPAIR METHOD, BLADE, AND GAS TURBINE

TECHNICAL FIELD

The present disclosure relates to a blade repair method, a blade, and a gas turbine.

Priority is claimed on Japanese Patent Application No. 2019-231773, filed Dec. 23, 2019, the content of which is incorporated herein by reference.

BACKGROUND ART

A gas turbine includes rotor blades and stator vanes that are high-temperature components. Since the rotor blade and the stator vane are exposed to a high-temperature combustion gas atmosphere, the materials of the rotor blade and the stator vane degrade. For this reason, there is a case where a crack occurs in the outer peripheral portion of a platform of the rotor blade or a platform of the stator vane.

PTL 1 discloses a method of repairing a portion to be repaired that includes filling a portion to be repaired of a preform, in which a crack occurs, with a brazing repair material and performing diffusion heat treatment to integrally join the brazing repair material to the portion to be repaired.

CITATION LIST

Patent Literature

PTL 1 Japanese Unexamined Patent Application Publication No. 2009-285664

SUMMARY OF INVENTION

Technical Problem

However, in a case where brazing repair is performed, strength is not sufficient in spite of repair due to low strength of a brazing material. For this reason, there is a possibility that cracks will occur again.

An object of the present disclosure is to provide a blade repair method, a blade, and a gas turbine that can suppress the generation of a crack on an end surface of a platform during an operation and suppress the generation of a crack during welding work.

Solution to Problem

In order to achieve the above-mentioned object, a blade repair method according to an aspect of the present disclosure is a blade repair method of repairing a crack formed in a blade toward a blade body from an end surface of a platform in a blade width direction including a direction perpendicular to a blade height direction. The blade includes: the blade body that is disposed in a combustion gas flow channel in which combustion gas flows and has an airfoil shape; and the platform that is provided at an end of the blade body in the blade height direction, extends in the blade width direction, and partitions a part of an edge of the combustion gas flow channel. The blade repair method includes: a notched portion-forming step of forming a notched portion, which is recessed toward the blade body from the end surface of the platform and includes a first region positioned close to the blade body and a second region positioned closer to the end surface of the platform than the first region, by removing a crack-containing region, which includes the crack, in the platform not yet repaired; a first welding step of filling the first region with a first welding material by overlay welding using the first welding material; and a second welding step of filling the second region with a second welding material by overlay welding using the second welding material after the first welding step. High-temperature strength of the second welding material is higher than high-temperature strength of the first welding material, weldability of the first welding material is higher than weldability of the second welding material, and the second region is a region in a range of 1.0 mm to 3.0 mm toward the blade body from the end surface of the platform.

Advantageous Effects of Invention

According to the present disclosure, it is possible to suppress that a crack occurs in a repaired portion again.

DESCRIPTION OF EMBODIMENTS

First Embodiment

A gas turbine 10 according to a first embodiment will be described with reference to FIG. 1. For the convenience of description, a generator 15, which is not a component of the gas turbine 10, is also shown in FIG. 1.

Figure 1:
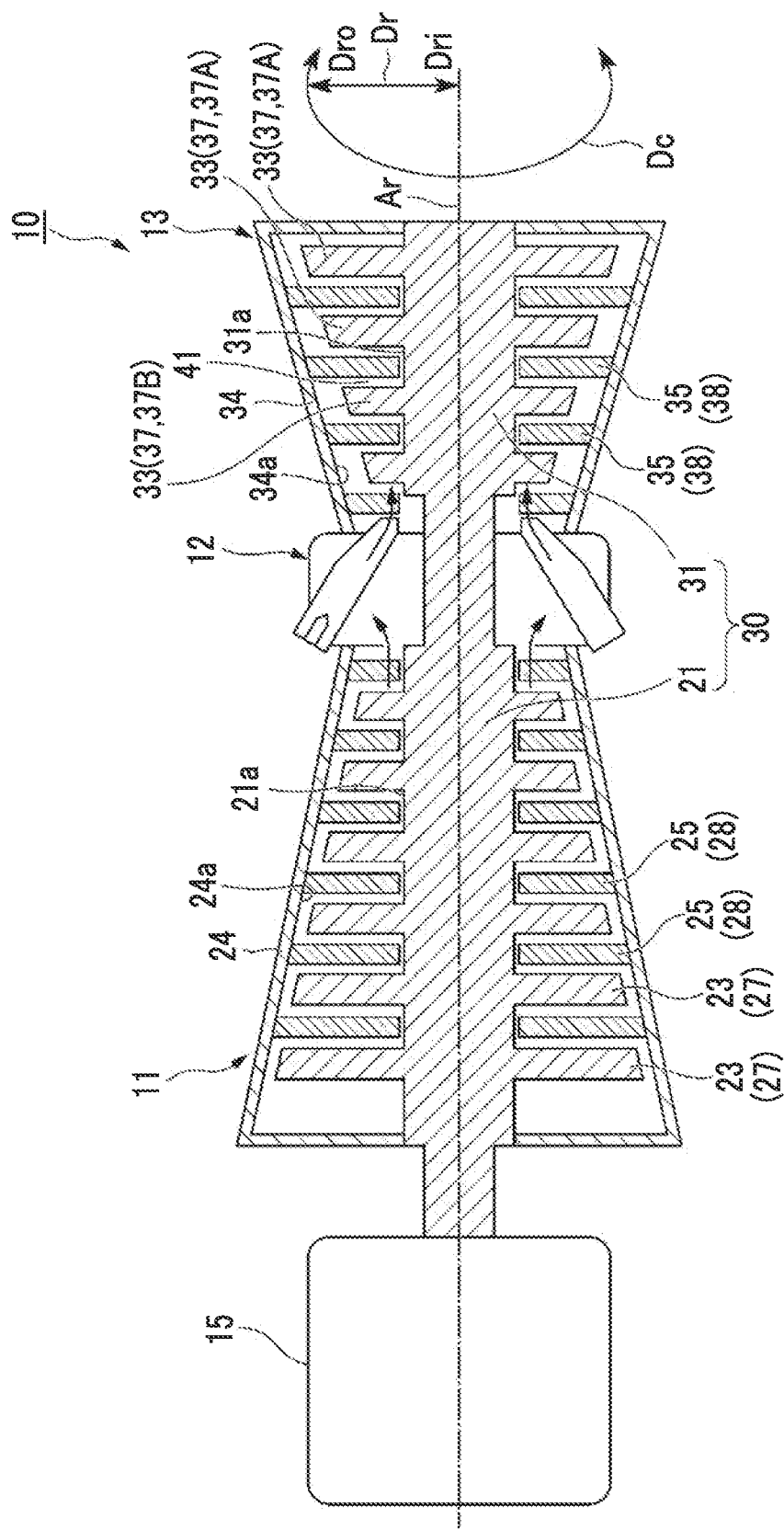
FIG. 1 is a schematic cross-sectional view of a gas turbine according to a first embodiment of the present disclosure.

In FIG. 1, Ar denotes the axis of a rotor 30 (hereinafter, referred to as "axis Ar"), Dr denotes the circumferential direction of the rotor 30 (hereinafter, referred to as "circumferential direction Dc"), Dri denotes the radial direction of the rotor 30 (hereinafter, referred to as "radial direction Dr"), Dri denotes a radial inner side that is close to the axis Ar in the radial direction Dr (hereinafter, referred to as "radial inner side Dri"), and Dro denotes a radial outer side that is opposite to the radial inner side Dri and is away from the axis Ar in the radial direction Dr (hereinafter, referred to as "radial outer side Dro").

The axis Ar is also the axis of a turbine rotor 31. Further, arrows shown in FIG. 1 indicate directions in which gas flows.

In the first embodiment, a case where a repaired turbine rotor blade 37B is included in a plurality of turbine rotor blades 37 will be described below by way of example.

A crack 69 occurring in a pressure-side platform 47 of the turbine rotor blade 37B is repaired. The main cause of this crack 69 is thermal fatigue that is caused by the repetition of thermal stress generated at the time of start, operation, and stop of the gas turbine 10.

(Overall Configuration of Gas Turbine)

The gas turbine 10 includes a compressor 11, a combustor 12, and a turbine 13.

The compressor 11 includes a compressor rotor 21, a plurality of compressor rotor blade stages 23, a compressor casing 24, and a plurality of compressor stator vane stages 25.

The compressor rotor 21 is a rotating body that is formed in a cylindrical shape. The compressor rotor 21 includes an outer peripheral surface 21a. The compressor rotor 21 is connected to a turbine rotor 31 of the turbine 13. The compressor rotor 21 forms a rotor 30 together with the turbine rotor 31. The compressor rotor 21 is rotated about the axis Ar.

The plurality of compressor rotor blade stages 23 are arranged on the outer peripheral surface 21a of the compressor rotor 21 at intervals in the direction of the axis Ar. Each of the compressor rotor blade stages 23 includes a plurality or compressor rotor blades 27 that are arranged at intervals in the circumferential direction Dc of the outer peripheral surface 21a of the compressor rotor 21. The plurality of compressor rotor blades 27 are rotated together with the compressor rotor 21.

The compressor casing 24 houses the compressor rotor 21 and the plurality of compressor rotor blade stages 23 in a state where a gap is interposed between the compressor casing 24 and the tip portion of each of the plurality of compressor rotor blades 27.

The compressor casing 24 is a cylindrical member that has the axis Ar as a central axis. The compressor casing 24 includes an inner peripheral surface 24a.

The plurality of compressor stator vane stages 25 are arranged on the inner peripheral surface 24a of the compressor casing 24 at intervals in the direction of the axis Ar.

The plurality of compressor stator vane stages 25 are arranged so that the compressor rotor blade stages 23 and the compressor stator vane stages 25 are alternately arranged as viewed in the direction oil the axis Ar.

Each of the compressor stator vane stages 25 includes a plurality or compressor stator vanes 28 that are arranged at intervals in the circumferential direction Dc of the inner peripheral surface 24a of the compressor casing 24.

The compressor 11 having the above-mentioned configuration takes in air for combustion and generates compressed air. The compressed air generated by the compressor 11 flows into the combustor 12.

The combustor 12 is provided between the compressor 11 and the turbine 13. The combustor 12 injects fuel into the compressed air, which is generated by the compressor 11, to generate combustion gas. The high-temperature combustion gas, which is generated by the combustor 12, is introduced into the turbine 13 and drives the turbine 13.

The turbine 13 includes a turbine rotor 31, a plurality of turbine rotor blade stages 33, a turbine casing 34, and a plurality of turbine stator vane stages 35.

The turbine rotor 31 is a rotating body that is formed in a cylindrical shape. The turbine rotor 31 includes an outer peripheral surface 31a. The turbine rotor 31 is rotated about the axis Ar.

The plurality of turbine rotor blade stages 33 are arranged on the outer peripheral surface 31a of the turbine rotor 31 at intervals in the direction of the axis Ar. Each of the turbine rotor blade stages 33 includes a plurality of turbine rotor blades 37 that are arranged at intervals in the circumferential direction Dc of the outer peripheral surface 31a of the turbine rotor 31. The plurality of turbine rotor blades 37 are rotated together with the turbine rotor 31.

A turbine rotor blade 37A not yet repaired and the turbine rotor blade 37B of which a portion in which a crack 69 has occurred is repaired are included in the plurality of turbine rotor blades 37.

The specific configuration of the repaired turbine rotor blade 37B will be described later with reference to FIGS. 2 to 6.

The turbine casing 34 houses the turbine rotor 31 and the plurality of turbine rotor blade stages 33 in a state where a gap is interposed between the turbine casing 34 and the tip portion of each of the plurality of turbine rotor blades 37.

The turbine casing 34 is a cylindrical member that has the axis Ar as a central axis. The turbine casing 34 includes an inner peripheral surface 34a.

An annular space, which is formed between the turbine casing 34 and the turbine rotor 31 and in which the turbine rotor blades 37 and turbine stator vanes 38 are arranged in the direction of the axis Ar, functions as a combustion gas flow channel 41 in which the combustion gas generated by the combustor 12 flows.

The plurality of turbine stator vane stages 35 are arranged on the inner peripheral surface 34a of the turbine casing 34 at intervals in the direction of the axis Ar. The plurality of turbine stator vane stages 35 are arranged so that the turbine rotor blade stages 33 and the turbine stator vane stages 35 are alternately arranged as viewed in the direction of the axis Ar.

Each of the turbine stator vane stages 35 includes a plurality of turbine stator vanes 38 that are arranged at intervals in the circumferential direction Dc of the inner peripheral surface 34a of the turbine casing 34.

(Overall Configuration of Repaired Turbine Rotor Blade)

Figure 2:
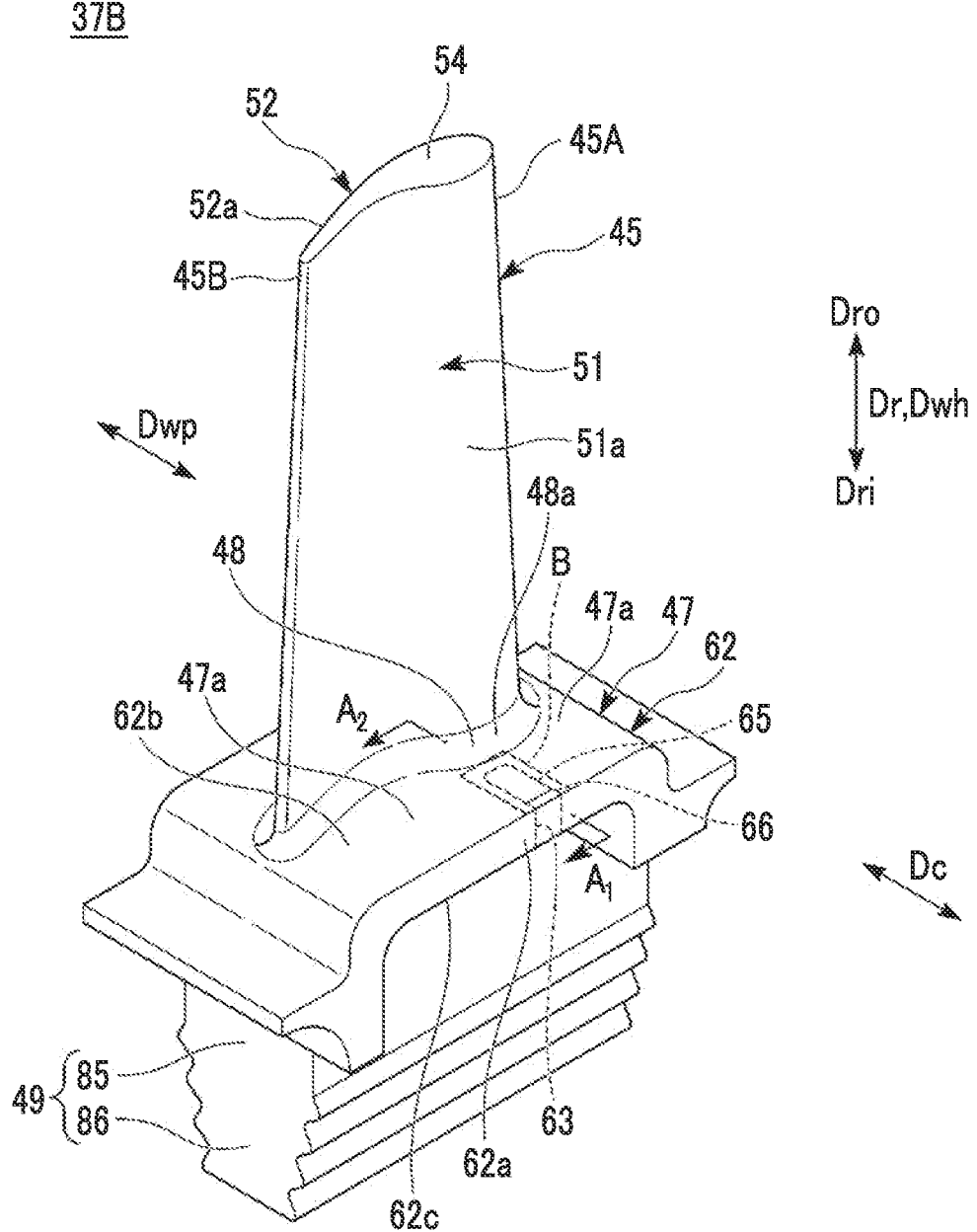
FIG. 2 is a perspective view of a repaired turbine rotor blade shown in FIG. 1.
Figure 5:
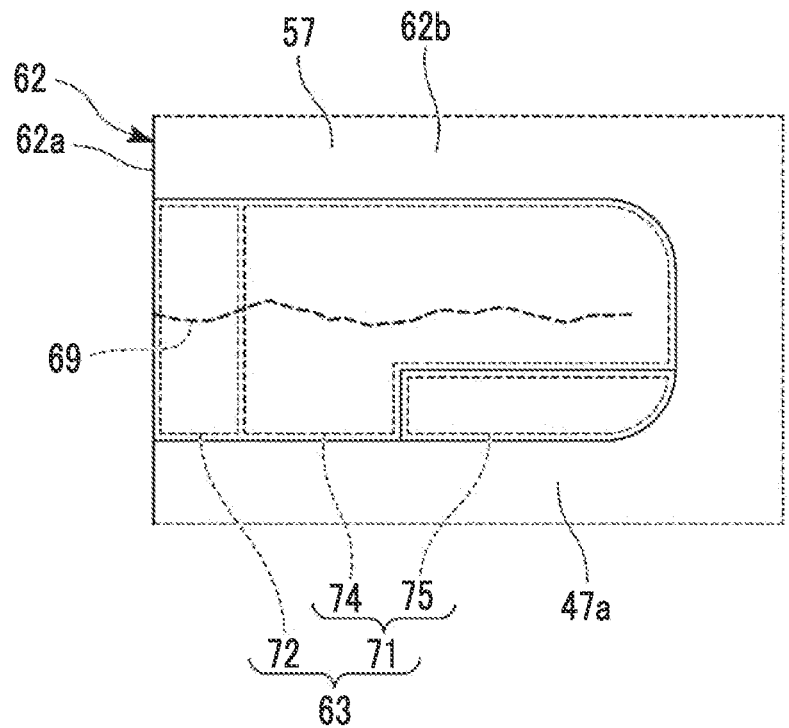
FIG. 5 is a top view showing a state where a first welded portion and a second welded portion are removed from a notched portion shown in FIG. 4.
Figure 6:
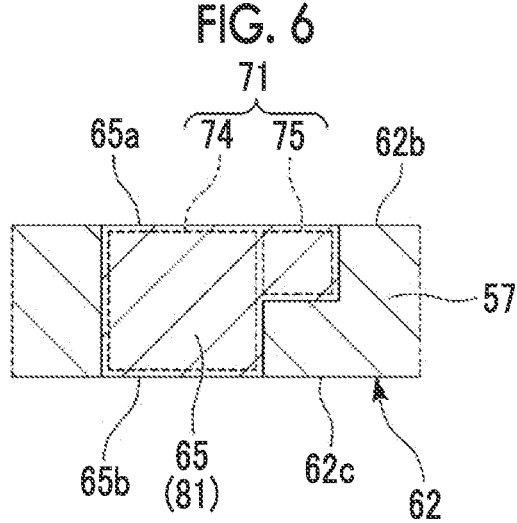
FIG. 6 is a cross-sectional view of a structure shown in FIG. 4 taken along line $C_1$-$C_2$.

The configuration of the repaired turbine rotor blade 37B (blade) will be described with reference to FIGS. 2 to 6. In FIG. 2, Dwh denotes the height direction of a blade body 45 (hereinafter, referred to as "blade height direction Dwh") and Dwp denotes a blade width direction that includes a component perpendicular to the blade height direction Dwh (hereinafter, referred to as "blade width direction Dwp"). For the convenience of description, a crack 69, which is removed from a platform body 62 in a case where a notched portion 63 is formed, is shown in FIG. 5 by a dotted line.

In FIG. 2, the same components as those of the structure shown in FIG. 1 are denoted by the same reference numerals as those of FIG. 1. Further, in FIGS. 2 to 6, the same components are denoted by the same reference numerals.

The turbine rotor blade 37B includes a blade body 45, a repaired platform 47, a fillet portion 48, and a shaft attachment portion 49.

(Configuration of Blade Body)

The blade body 45 has an airfoil shape, and is disposed in the combustion gas flow channel 41 (see FIG. 1) in which combustion gas flows.

The blade body 45 includes a leading edge 45A, a trailing edge 45B, a pressure surface-side blade wall 51, a suction surface-side blade wall 52, a top plate 54, and a cooling channel (not shown).

The pressure surface-side blade wall 51 and the suction surface-side blade wall 52 extend from a gas path surface 47a of the platform 47 in the radial direction Dr (blade height direction Dwh). Each of the pressure surface-side blade wall 51 and the suction surface-side blade wall 52 has a curved shape. The pressure surface-side blade wall 51 and the suction surface-side blade wall 52 are connected to each other by the leading edge 45A and the trailing edge 45B.

The pressure surface-side blade wall 51 has a pressure surface 51a that forms the outer surface of the pressure surface-side blade wall 51. The suction surface-side blade wall 52 includes a suction surface 52a that forms the outer peripheral surface of the suction surface-side blade wall 52.

The top plate 54 is a plate-like member, and is provided at tip portions, which are disposed on the radial outer side Dro, of end portions (specifically, base end portions and tip portions) of the pressure surface-side blade wall 51 and the suction surface-side blade wall 52.

The cooling channel (not shown) is formed in the blade body 45. A cooling medium for cooling the blade body 45, which is disposed in a high temperature atmosphere, flows in the cooling channel (not shown).

The blade body 45 having the above-mentioned configuration includes a metal preform 57 that forms the shape of the blade body 45 and a thermal barrier coating 58 (TBC) that is formed on the surface of the metal preform 57.

The metal preform 57 is made of a metallic material that is excellent in heat resistance. For example, a Ni-base superalloy can be used as the metallic material used for the metal preform 57.

The thermal barrier coating 58 has a function to protect the metal preform 57 from high-temperature combustion gas.

(Overall Configuration of Repaired Platform)

The platform 47 is provided at the base end of the blade body 45 in the blade height direction Dwh. The platform 47 includes a gas path surface 47a on which the base end of the blade body 45 is to be disposed. The platform 47 partitions a part of the edge of the combustion gas flow channel 41 shown in FIG. 1.

The platform 47 includes a platform body 62, a notched portion 63, a first welded portion 65, a second welded portion 66, and a thermal barrier coating 53.

(Configuration of Platform Body)

The platform body 62 extends in the blade width direction Dwp that includes a direction perpendicular to the blade height direction Dwh. The platform body 62 includes an end surface 62a that is disposed close to the pressure surface 51a in the blade width direction Dwp, one surface 62b that is disposed close to the blade body 45, and the other surface 62c that is disposed on a side opposite to one surface 62b (close to the shaft attachment portion 49).

A crack 69 occurring in the platform 47 is formed in a direction toward the blade body 45 from the end surface 62a. Further, a crack 69 is likely to repeatedly occur at a specific position on the end surface 62a of the platform body 62.

The platform body 62 having the above-mentioned configuration is formed of the metal preform 57 forming the shape of the platform 47.

(Configuration of Notched Portion)

A crack-containing region P, in which a crack 69 occurs, of the platform body 62 is removed, so that the notched portion 63 is formed in the platform body 62. The notched portion 63 is formed to be recessed toward the blade body 45 from the end surface 62a of the platform body 62.

The notched portion 63 is recessed toward the blade body 45 from the end surface 62a of the platform body 62, and includes a first region 71 and a second region 72.

The first region 71 is a region, which is disposed close to the blade body 45, of the notched portion 63.

The first region 71 includes a penetrating portion 74 and a non-penetrating portion 75. The penetrating portion 74 is a space that is formed so that a region, in which a crack 69 is formed, of the platform body 62 forming the gas path surface 47a is perforated in the thickness direction of the platform body 62 (blade height direction Dwh).

The non-penetrating portion 75 is a space that is formed so that a portion, which is positioned close to the blade body 45, of the platform body 62 is scraped off and a portion, which is positioned close to the shaft attachment portion 49, thereof is made to remain. The non-penetrating portion 75 is formed integrally with the penetrating portion 74.

The second region 72 is disposed closer to the end surface 62a of the platform body 62 than the first region 71. The second region 72 is formed integrally with the first region 71.

The length L2 of the second region 72 in the direction toward the blade body 45 from the end surface 62a is significantly shorter than the length L1 of the first region 71 in the direction toward the blade body 45 from the end surface 62a.

(Configuration of First and Second Welded Portions)

The first welded portion 65 is disposed to fill the first region 71. The first, welded portion 65 includes one surface 65a and the other surface 65b.

One surface 65a is disposed close to the blade body 45, and is formed to be flush with one surface 62b of the platform body 62. The other surface 65b is disposed on a side opposite to one surface 65a (close to the shaft attachment portion 49), and is formed to be flush with the other surface of the platform body 62.

The first welded portion 65 is made of a first welding material 81 that is used to overlay-weld the first region 71.

The second welded portion 66 is disposed to fill the second region 72. The second welded portion 66 is made of a second welding material 82 that is used to overlay-weld the second region 72. That is, the notched portion 63 is filled with the first and second welded portions 65 and 66. The second welded portion 66 includes one surface 66a, the other surface 66b, one end surface 65c, and the other end surface 66d.

One surface 66a is disposed close to the blade body 45 and is formed to be flush with one surface 62b of the platform body 62. The other surface 66b is disposed on a side opposite to one surface 66a (close to the shaft attachment portion 49), and is formed to be flush with the other surface 62c of the platform body 62.

One end surface 66c is disposed close to the end surface 62a of the platform body 62. One end surface 66c is formed to be flush with the end surface 62a of the platform body 62.

The other end surface 66d is disposed on a side opposite to one end surface 66c (close to blade body 45). The other end surface 66d is in contact with the first welded portion 66.

The one end surface 66c and the other end surface 66d described above are arranged in the blade width direction Dwp.

In a case where one end surface 66c of the second welded portion 66 disposed close to the end surface 62a of the platform body 62 is used as a reference, the thickness M1 of the second welded portion 66 in a direction toward the blade body 45 from one end surface 66c of the second welded portion 66 is equal to the length L2 of the second region 72 described above.

The thickness M1 of the second welded portion 66 is set in the range of 1.0 mm to 3.0 mm. The thickness M1 of the second welded portion 66 is preferably in the range of 1.5 mm to 2.5 mm and more preferably in the range of 1.5 mm to 2.0 mm.

A portion where the first and second welded portions 65 and 66 are disposed in the notched portion 63 is a repaired portion of the platform 47 (hereinafter, simply referred to as "repaired portion").

(Configuration of First and Second Welding Materials)

A material, which has weldability higher than the weldability of the second welding material 82, is used as the material of the first welding material 81.

A material, which has high-temperature strength higher than the high-temperature strength of the first welding material 81, is used as the material of the second welding material 82.

Specifically, for example, Inconel 625 (composition: 61.0% by mass of Ni, 22.0% by mass of Cr, 9.0% by mass of Mo, and 5.0% by mass of Fe), which is a Ni—Cr—Fe-based nickel alloy, can be used as the material of the first welding material 81.

In a case where Inconel 625 is used as the material of the first welding material 81, for example, MGA1400 (normal cast alloy), No. 14, MGA2400 (normal cast alloy), and the like, which are materials having high-temperature strength higher than the high-temperature strength of Inconel 625, can be used as the material of the second welding material 82.

Among these three types of materials, the MGA1400 has the highest high-temperature strength and the MGA2400 has the lowest high-temperature strength. The high-temperature strength of No. 14 is lower than the high-temperature strength of MGA1400 and is higher than the high-temperature strength of MGA2400.

The composition of MGA1400 includes 12.0 to 14.2% by mass of Cr, 8.5 to 11.0% by mass of Co, 1.0 to 3.5% by mass of Mo, 3.5 to 6.2% by mass of W, 3.0 to 5.5% by mass of Ta, 3.5 to 4.5% by mass of Al, 2.0 to 3.2% by mass of Ti, 0.04 to 0.12% by mass of C, 0.005 to 0.05% by mass of B, and 0.001 to 5 ppm of Zr, with a remainder consisting of Ni and unavoidable impurities.

The composition of No. 14 includes C of which the content exceeds 0.13% by mass and is not more than 0.30% by mass, 15.7 to 16.3% by mass of Cr, 8.00 to 9.00% by mass of Co, 1.50 to 2.00% by mass of Ta, 1.5 to 5.0% by mass of at least one of Mo or W, Ti of which the content is 1.70% by mass or more and less than 3.20% by mass, and Al of which the content is 1.70% by mass or more and less than 3.20% by mass, with a remainder consisting of Ni.

The composition of MGA2400 includes 0.05 to 0.25% by mass of C, 10 to 20% by mass of Cr, 15 to 25% by mass of Co, one or two of Mo of which the content is up to 3.5% by mass and W of which the content is up to 0.5 to 10% by mass and the value of W+1/2Mo is in the range of 0.5 to 10% by mass, 1.0 to 5.0% by mass of Ti, 1.0 to 4.0% by mass of Al, 0.5 to 4.5% by mass of Ta, 0.2 to 3.0% by mass of Nb, 0.005 to 0.1.0% by mass of Zr, and 0.001 to 0.01% by mass of B, with a remainder consisting of Ni and unavoidable impurity elements. For example, the (Al+Ti) content can be set to about 5.5% by mass and the (W+1/2Mo) content can be set to about 6.0% by mass.

The thermal barrier coating 58 is formed to cover portions, which are positioned close to the blade body 45, of one surface 62b having been repaired, one surface 65a of the first welded portion 65, one surface 66a of the second welded portion 66, and one end surface 66c of the second welded portion 66.

The thermal barrier coating 58 has a function to protect the platform body 62 and the repaired portion of the platform body 62 from high-temperature combust ion gas.

The fillet portion 48 is a connecting portion between the blade body 45 and the platform 47, and includes a surface 48a along which combustion gas flows.

The surface 48a is formed of a curved surface that allows the gas path surface 47a of the platform 47 partitioning a part of the edge of the combustion gas flow channel 41 (see FIG. 1) to gradually become the blade surface (the pressure surface 51a in the case of FIG. 3) of the blade body 45.

The fillet portion 48 has a starting end 48S and a trailing end 48E that are disposed in the blade width direction Dwp.

The starting end 48S is an end that is disposed close to the platform 47. The trailing end 48E is an end that is disposed close to the blade body 45.

The fillet portion 48 includes a heat-affected zone (HAZ) 48A that is formed during overlay welding in a case where the first welded portion 65 is formed. The heat-affected zone 48A is disposed closer to the end surface 62a of the platform body 62 than the trailing end 48E of the fillet portion 48.

A heat-affected width W1, which is the width of the heat-affected zone 48A in the blade width direction Dwp, can be set to, for example, 3 mm.

The shaft attachment portion 49 includes a shank 85 and a blade root 86.

The shank 85 is provided on one side of the platform 47 opposite to a side on which the blade body 45 is provided. The shank 85 extends from the platform 47 in the blade height direction Dwh.

The blade root 86 is provided at the end portion of the shank 85 that is positioned on the radial inner side Dri. The blade root 86 extends from the shank 35 in the blade height direction Dwh. The cross-sectional shape of the blade root 86 is the shape of a Christmas tree. The blade root 36 is fitted to a blade root groove (not shown) that is formed in the turbine rotor 31 (see FIG. 1).

(Effects of Blade (Turbine Rotor Blade) According to First Embodiment)

Since the first region 71, which is positioned close to the blade body 45, of the notched portion 63 is made of the first welding material 81 having weldability higher than the weldability of the second welding material 82 as described above, the generation of a crack 69 caused by welding work can be suppressed. That is, the generation of a crack 69 caused by residual stress after the welding work can be suppressed.

A crack 69 to be formed in the platform 47 is formed on the end surface 62a of the platform 47 first, and then grows in the platform 47.

Accordingly, since the second welded portion 66, which is made of the second welding material 82 having high-temperature strength higher than the high-temperature strength of the first welding material 81, is disposed in the second region 72, which is positioned closer to the end surface 62a of the platform 47 than the first region 71, of the notched portion 63, it is possible to suppress the generation of a crack 69 in the second welded portion 66 during the operation of the gas turbine 10.

Therefore, it is possible to suppress the generation of a crack 69 in the repaired portion (a portion where the first and second welded portions 65 and 66 are disposed in the notched portion 63) during the operation.

There is generally an incompatibility between the strength of a material and weldability, as the properties of a welding material, and the incompatibility is particularly significant in a case where high-temperature strength is required.

That is, since a welding material having high creep or high high-temperature LCF strength is inferior in weldability, the welding material is likely to crack after welding.

On the other hand, since the high-temperature strength of a material having good weldability is relatively low, the material is less likely to crack after welding.

Further, a large amount of heat needs to be applied to a difficult-to-weld material having low weldability, such as the second welding material 82, during welding. For this reason, a base material is likely to be affected by heat during welding, so that the thermal welding-affected zone (HAZ) is likely to crack.

Furthermore, since the thickness M1 of the second welded portion 66 in the direction toward the blade body 45 from one end surface 66c is excessively small in a case where the thickness M1 of the second welded portion 66 in the direction toward the blade body 45 from one end surface 66c of the second welded portion 66 is set to be less than 1.0 mm, it is difficult to suppress the generation of a crack 69 in the second welded portion 66 during an operation.

Further, since the strength of the second welding material 82 against thermal fatigue is higher than that of the first welding material 81 against thermal fatigue, it is preferable that the thickness M1 of the second welded portion 66 made of the second welding material 82 is increased in terms of structural design in order to ensure sufficient strength against the repetition of thermal stress generated at the end portion of the platform 47 during an operation.

However, in a case where the thickness M1 of the second welded portion 66 is set to be larger than 3.0 mm, a portion where a crack 69 (not shown) caused by welding work is likely to occur in the repaired portion after welding is increased in size as much as that and the heat-affected zone 48A in the base material is also increased in size. For this reason, it is not preferable in terms of a welding crack to occur after repair that the thickness M1 of the second welded portion 66 is set to be larger than 3.0 mm.

Accordingly, in a case where the thickness M1 of the second welded portion 66 is set in the range of 1.0 mm to 3.0 mm, a crack 69 is less likely to occur on the end surface 62a during an operation. As a result, a crack 69 (not shown) caused by welding work less occurs in a repaired portion.

Further, in a case where the thickness M1 of the second welded portion 66 is set in the range of 1.5 mm to 2.5 mm, it is possible to further suppress the generation of a crack 69 (not shown) caused by welding work in the repaired portion.

Furthermore, in a case where the thickness M1 of the second welded portion 66 is set in the range of 1.5 mm to 2.0 mm, it is possible to further suppress the generation of a crack 69 (not shown) caused by welding work in the repaired portion.

In addition, since the first region 71 includes the non-penetrating portion 75 that does not penetrate the platform body 62, the non-penetrating portion 75 can be made to function as a support for supporting the melted first welding material 81 in a case where the first region 71 is overlay-welded using the first welding material 81. Accordingly, it is possible to easily perform overlay welding using the first welding material 81.

Further, since the heat-affected zone 48A is disposed closer to one end surface 66c of the platform 47 than the trailing end 48E of the fillet portion 48, it is possible to suppress the formation of the heat-affected zone 48A in the blade body 45. Accordingly, it is possible to suppress the deterioration of the performance of the blade body 45 that is caused by the heat-affected zone 48A.

A case where the platform 47 of the turbine rotor blade 37B, which is one of blades, is repaired has been described in the first embodiment by way of example. However, in a case where, a crack 69 occurs in, for example, a shroud (configuration (not shown) corresponding to the platform 47 of the rotor blade) of the turbine stator vane 38, a notched portion 63 may be formed at the shroud and first and second welded portions 65 and 66 may be disposed in the notched portion 63.

Figure 3:
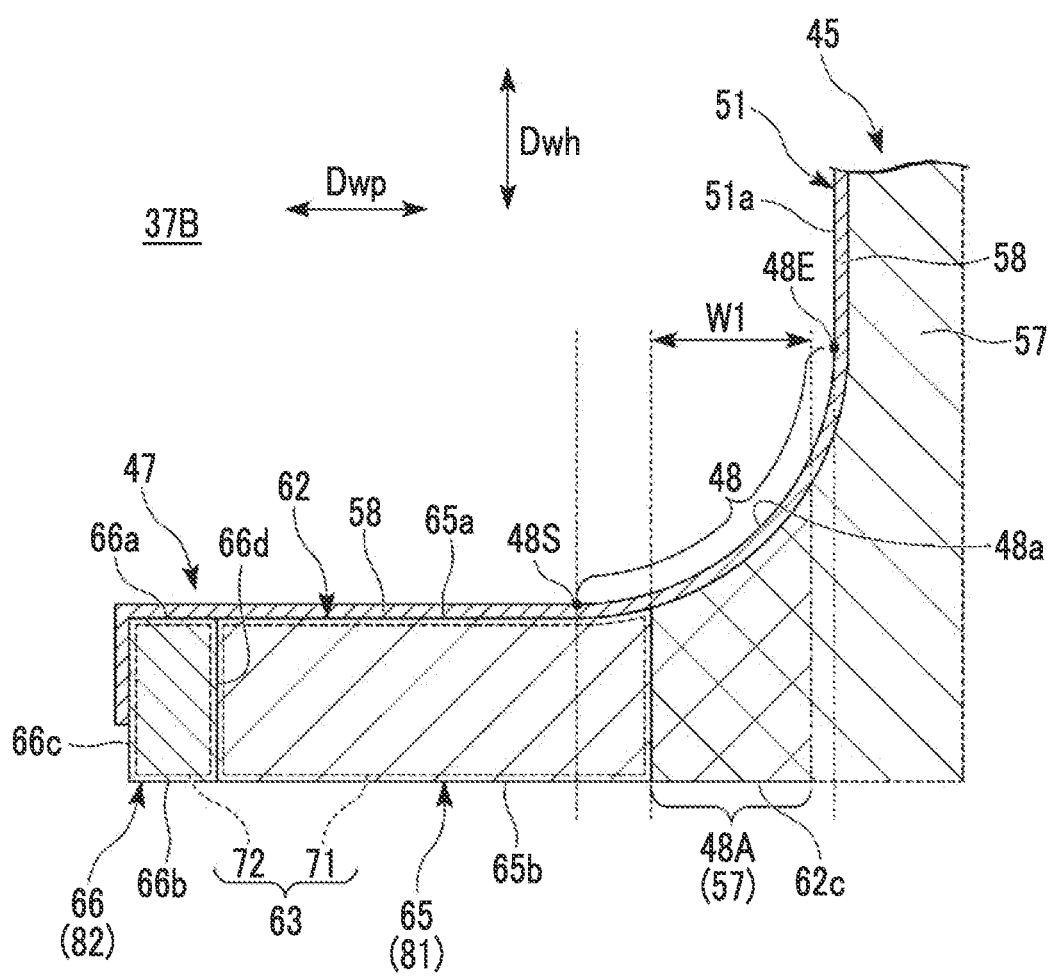
FIG. 3 is a cross-sectional view of the repaired turbine rotor blade shown in FIG. 2 taken along line $A_1$-$A_2$.
Figure 4:
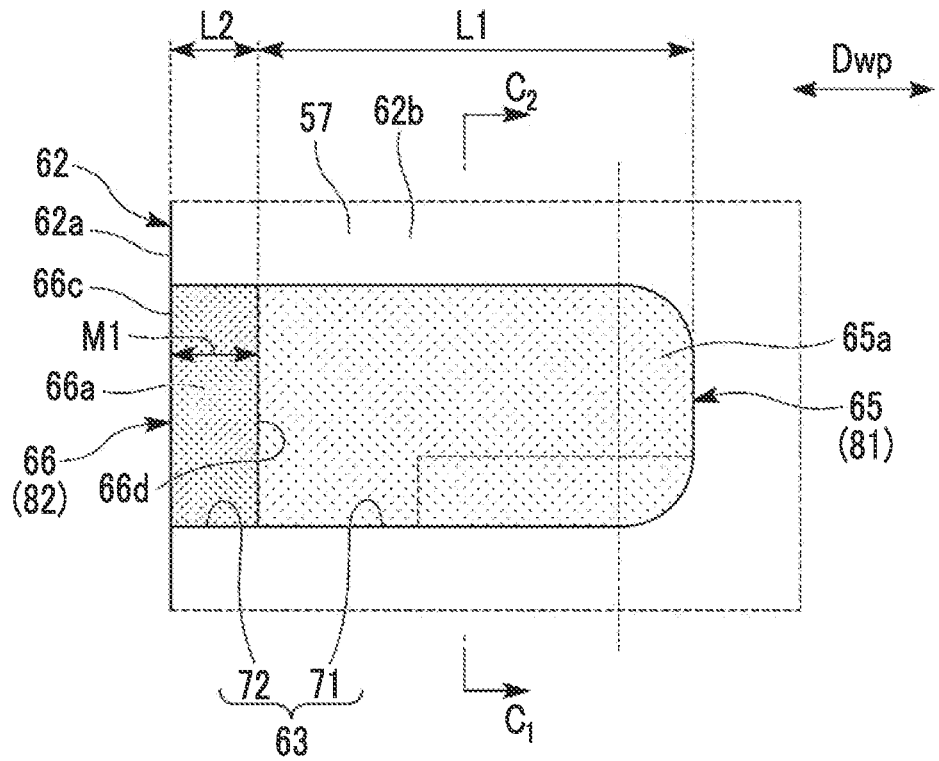
FIG. 4 is an enlarged top view of a portion, which is surrounded by a region B, of a platform shewn in FIG. 2

Next, the determination of whether to repair the turbine rotor blade 37B in which a crack 69 occurs will be described with reference to FIGS. 3, 7, and 8. In FIG. 8, the same components as those of the structure shown in FIGS. 2 and 3 are denoted by the same reference numerals as those of FIGS. 2 and 3.

Figure 7:
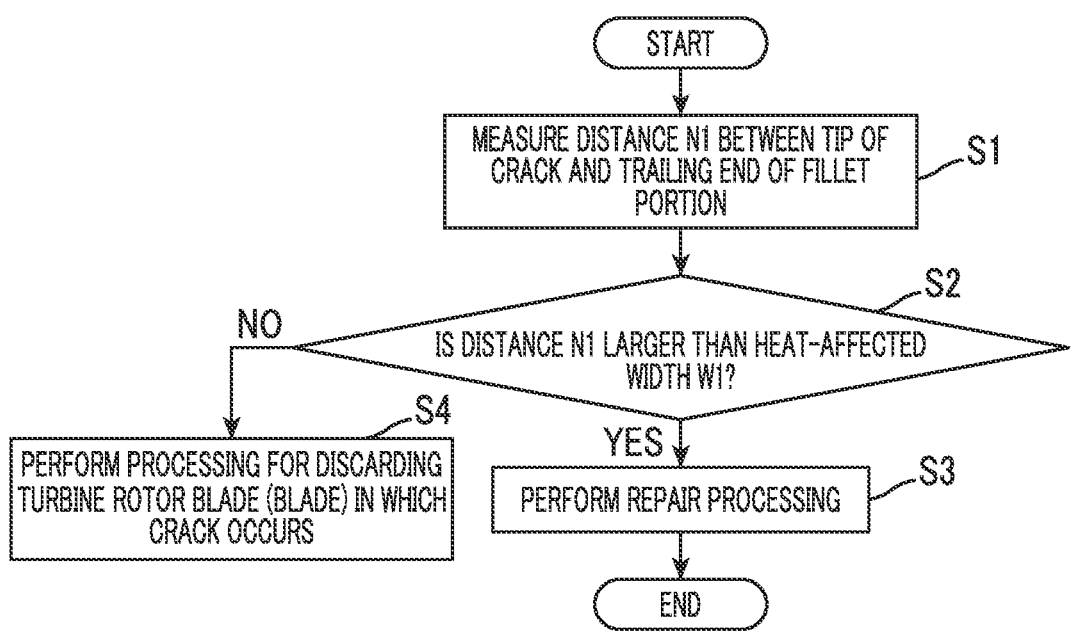
FIG. 7 is a flowchart, illustrating processing for determining whether to perform a blade (turbine rotor blade) repair method according to the first embodiment of the present disclosure.
Figure 8:
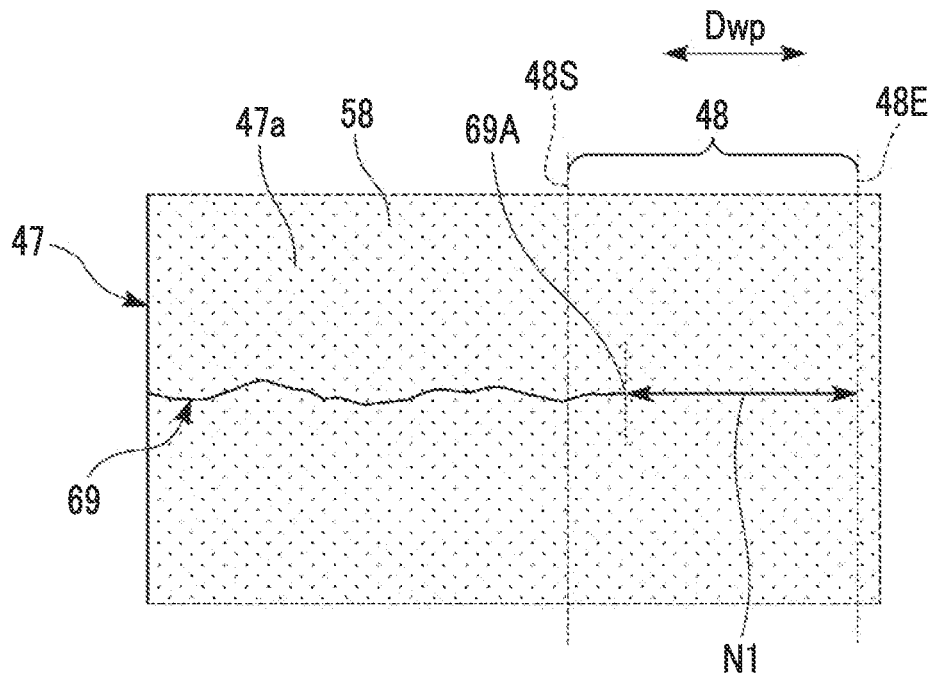
FIG. 8 is an enlarged cop view of a portion, in which a crack occurs, of the platform.

In a case where processing shown in FIG. 7 is started, a distance N1 between a tip 69A of the crack 69 closest to the blade body 45 and the trailing end 48E of the fillet portion 48 is measured in S1 as shown in FIG. 8.

Then, it is determined in S2 whether or not the distance N1 is larger than the heat-affected width W1 of the heat-affected zone 48A.

In a case where it is determined in S2 that the distance N1 is larger than the heat-affected width W1 of the heat-affected tone 48A (the heat-affected zone 48A is not formed in the blade body 45) (it is determined as Yes in S2), processing proceeds to S3 and repair processing is performed.

On the other hand, in a case where it is determined that the distance N1 is smaller than the heat-affected width W1 of the heat-affected zone 48A (the heat-affected zone 48A is formed in the blade body 45) (it is determined as No in S2), processing proceeds to S4.

Processing for discarding the turbine rotor blade 37B (blade) in which the crack 69 occurs is performed in S4.

(Effect of Determination of whether to Repair Platform)

Since repair processing (processing including first and second welding steps to be described later) is performed in a case where the distance N1 between the tip 69A of the crack 69 closest to the blade body 45 and the trailing end 48E of the fillet portion 48 is larger than the heat-affected width W1 as described above, the formation of the heat-affected zone 48A in the blade body 45 can be suppressed. Accordingly, the repaired turbine rotor blade 37B (blade) can be reused.

Next, the blade repair method according to the first embodiment (the repair processing of S3 shown in FIG. 7) will be described with reference to FIGS. 8 to 18. In FIGS. 9 to 18, the same components as those shown in FIGS. 1 to 6 are denoted by the same reference numerals as those of FIGS. 1 to 6.

Figure 9:
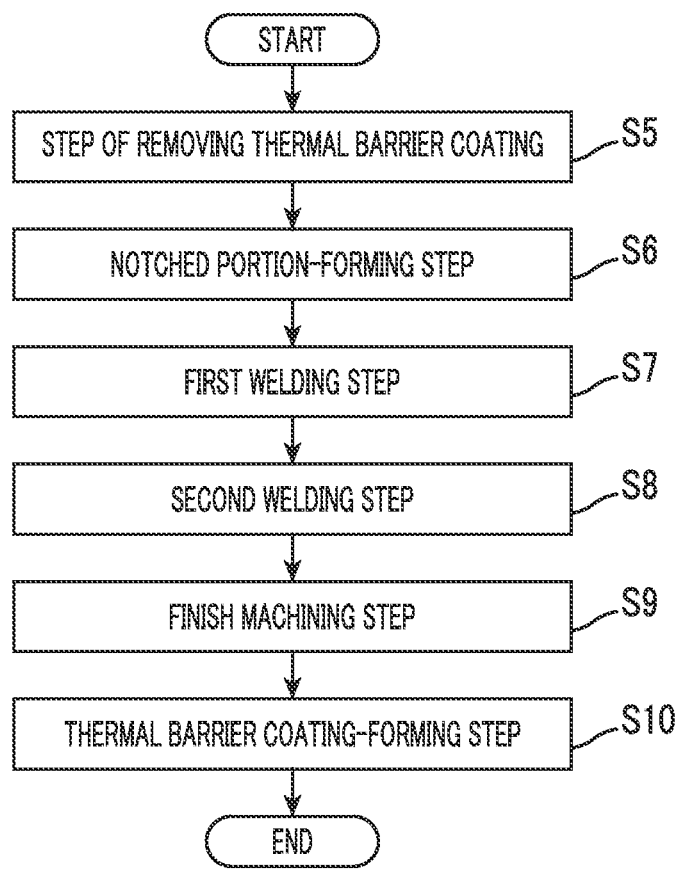
FIG. 9 is a flowchart illustrating the blade (turbine rotor blade) repair method according to the first embodiment of the present disclosure.
Figure 10:
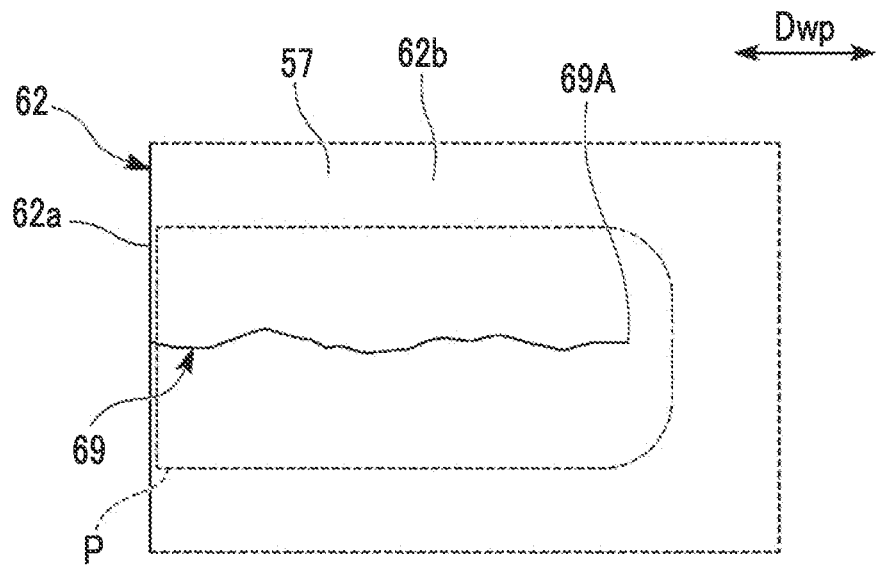
FIG. 10 is a top view schematically showing a state where a thermal barrier coating of the platform shown in FIG. 8 is removed.

In a case where processing shown in FIG. 9 is started, the thermal barrier coating 58 shown in FIG. 8 is removed in S5 as shown in FIG. 10. Accordingly, one surface 62b of the platform body 62 is exposed.

(Notched Portion-Forming Step)

Figure 11:
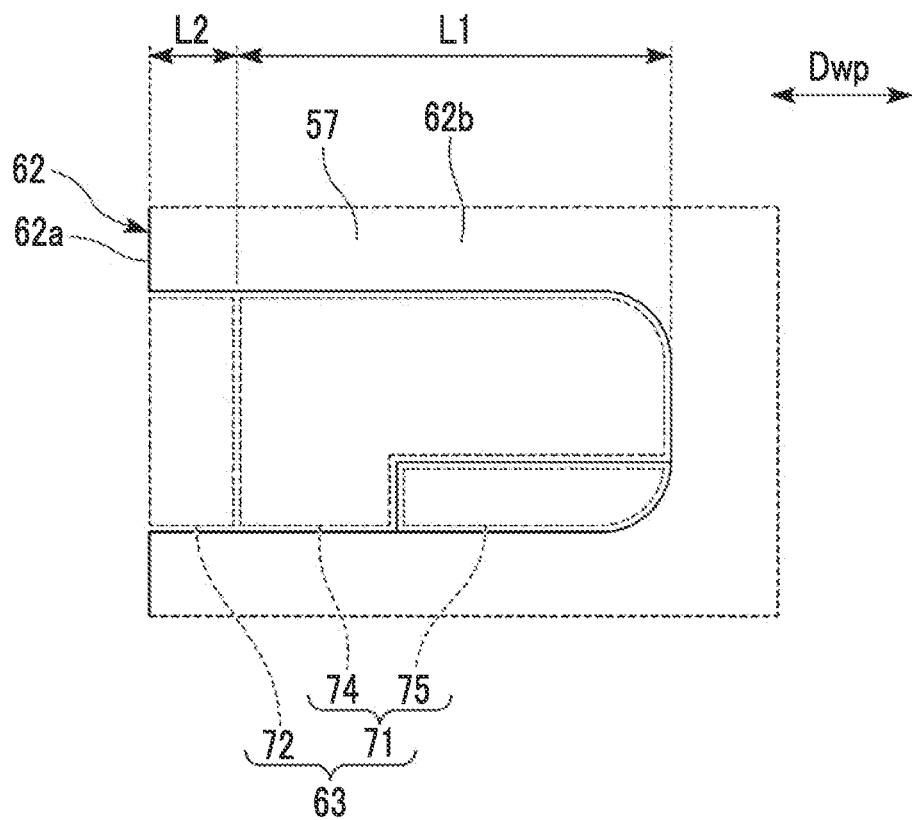
FIG. 11 is a top view schematically showing a state where a notched portion is formed at the platform shown in FIG. 10.

After that, a crack-containing region P, which includes the crack 69, of the platform body 62 not yet repaired, shown in FIG. 10, is removed in S6. Accordingly, a notched portion 63, which is recessed toward the blade body 45 (see FIG. 3) from the end surface 62a of the platform body 62 and includes a first region 71 positioned close to the blade body 45 and a second region 72 positioned closer to the end surface 62a of the platform body 62 than the first region 71, is formed as shown in FIG. 11. In S6, the notched portion 63 is formed by, for example, machining.

The second region 72 is formed in S6 so that the length L2 of the second region 72 is in the range of 1.0 mm to 3.0 mm.

Since the thickness of the second welding material 82 filling the second region 72 is less than 1.0 mm and the thickness of the second welding material 82 (see FIG. 14) is excessively small in a case where the length L2 of the second region 72 is set to be loss than 1.0 mm, it is difficult to suppress the generation of a crack 69 caused by the second welding material 82 during an operation.

Further, since the strength of the second welding material 82 against thermal fatigue is higher than that of the first welding material 81 (see FIG. 14) against thermal fatigue, it is desirable that the thickness of the second welding material 82 is increased in terms of structural design in order to ensure sufficient strength against the repetition of thermal stress generated at the end portion of the platform 47 during an operation.

Here, since the thickness of the second welding material 82 is larger than 3.0 mm in a case where the length L2 of the second region 72 is set to be larger than 3.0 mm, a portion where a crack 69 caused by welding work is likely to occur in the repaired portion after welding is increased in size and the heat-affected zone 48A in the base material is also increased in size. For this reason, it is not preferable in terms of a welding crack to occur after repair that the length L2 of the second region 72 is set to be larger than 3.0 mm.

Accordingly, in a case where the second region 72 is formed so that the length L2 of the second region 72 is in the range of 1.0 mm to 3.0 mm, it is possible to suppress the generation of a crack 69 on the end surface 62a of the platform 47 during an operation and to suppress the generation of a crack 69 during welding work.

The length L2 of the second region 72 is preferably set in the range of 1.5 mm to 2.5 mm and more preferably set in the range of 1.5 mm to 2.0 mm.

In S6, a penetrating portion 74 that penetrates the platform body 62 in the thickness direction of the platform body 62 and a non-penetrating portion 75 that does not penetrate the platform body 62 are formed in the first region 71.

(Effect of Formation of Non-Penetrating Portion)

Since the non-penetrating portion 75 that does not penetrate the platform body 62 is formed in the first region 71 as described above, the non-penetrating portion 75 can be made to function as a support for supporting the melted first welding material 81 in a case where the first region 71 is overlay-welded using the first welding material 81. Accordingly, it is possible to easily perform overlay welding using the first welding material 81.

(First Welding Step)

Figure 12:
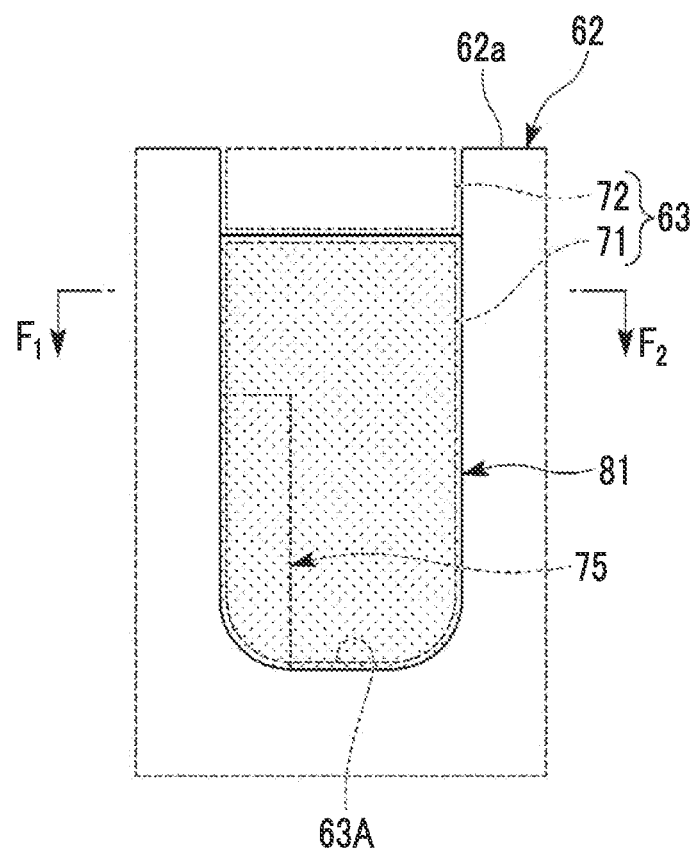
FIG. 12 is a diagram schematically showing a state where a tip of the notched portion shown in FIG. 11 faces downward and a first welding material is overlay-welded to a first region of the notched portion.
Figure 13:
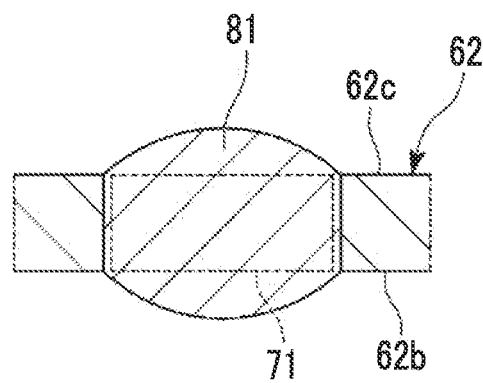
FIG. 13 is a cross-sectional view of a structure shown in FIG. 12 taken along line $F_1$-$F_2$.

After that, in S7, as shown in FIGS. 12 and 13, the first region 71 is filled with the first welding material 81 by overlay welding that uses the first welding material 81 having weldability higher than the weldability of the second welding material 82 (first welding step).

In this step, as shown in FIG. 13, the first welding material 81 protrudes from one surface 62b and the other surface 62c of the platform body 62.

For example, Inconel 625 described above can be used as the first welding material 81.

In this case, as shown in FIG. 12, overlay welding using the first welding material 81 may be performed in a state where a tip 63A of the notched portion 63 positioned close to the blade body 43 faces downward.

(Effect of First Welding Step Performed in State where Tip of Notched Portion Faces Downward)

Since the overlay welding of the first welding material 81 is performed in a state where the tip 63A of the notched portion 63 positioned close to the blade body 45 faces downward as described above, the tip 63A of the notched portion 63 can be made to function as a support surface for supporting the first welding material 81. Accordingly, it is possible to easily perform the first welding step.

(Second Welding Step)

Figure 14:
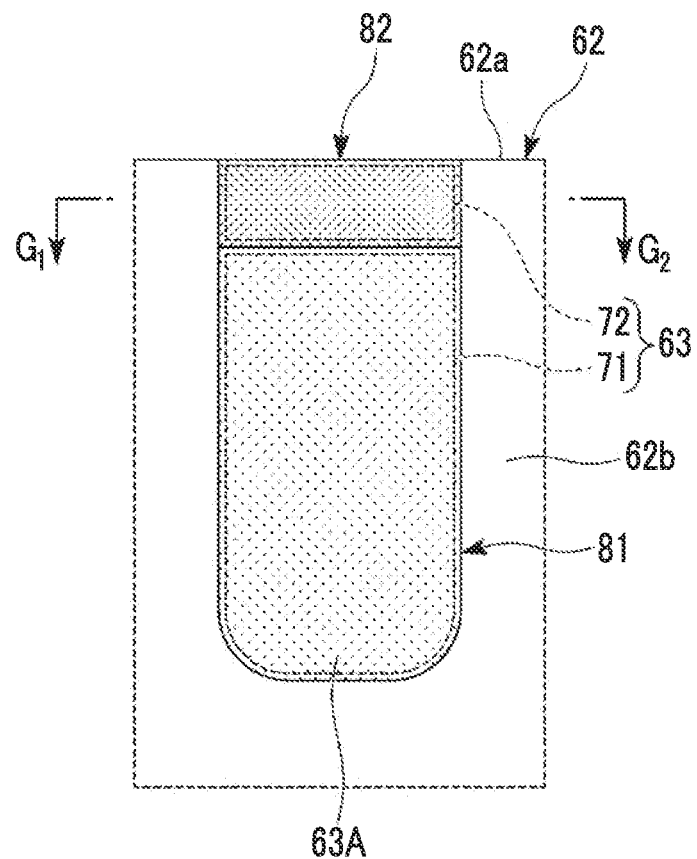
FIG. 14 is a diagram schematically showing a state where a second welding material is overlay-welded to a second region of the notched portion shown in FIG. 11.
Figure 15:
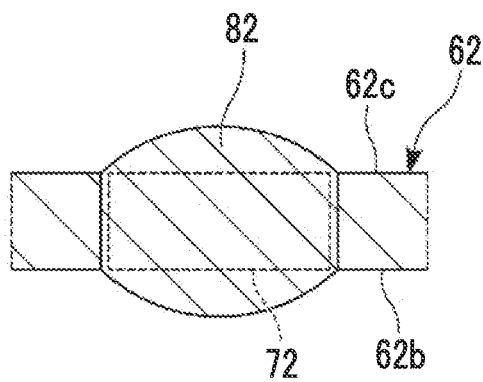
FIG. 15 is a cross-sectional view of a structure shown in FIG. 14 taken along line $G_1$-$G_2$.

After that, in S8, as shown in FIGS. 14 and 15, the second region 72 is filled with the second welding material 82 by overlay welding that uses the second welding material 82 having high-temperature strength higher than the high-temperature strength of the first welding material 81 (second welding step).

In this step, as shown in FIG. 15, the second welding material 82 protruded from one surface 62b and the other surface 62c of the platform body 62.

In a case where Inconel 625 is used as the first welding material 81, for example, MGA1400 (normal cast alloy), No. 14, MGA2400 (normal cast alloy), and the like described above can be used as the second welding material 82.

In this case, as shown in FIG. 14, overlay welding using the second welding material 82 may be performed in a state where the tip 63A of the notched portion 63 positioned close to the blade body 45 faces downward.

(Effect of Second Welding Step Performed in State where Tip of Notched Portion Faces Downward)

Since the overlay welding of the second welding material 82 is performed in a state where the tip 63A of the notched portion 63 positioned close to the blade body 45 faces downward as described above, the end surface of the first welding material 81 can be made to function as a support for supporting the second welding material 82. Accordingly, it is possible to easily perform the second welding step.

(Finish Machining Step)

Figure 16:
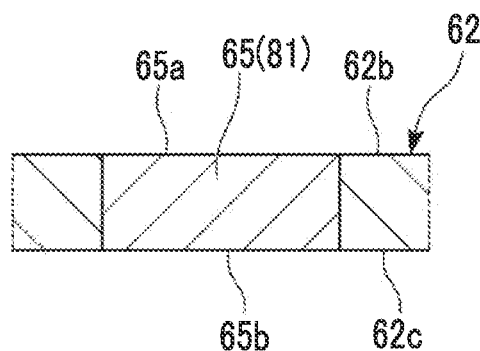
FIG. 16 is a cross-sectional view of the first region of the platform having been subjected to finishing.
Figure 17:
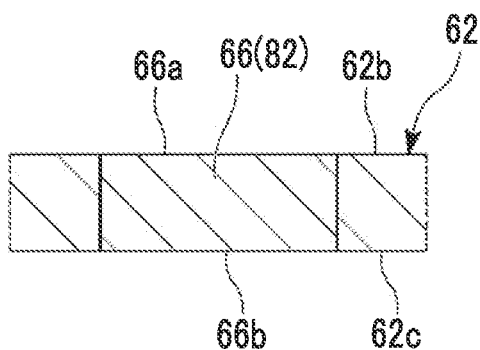
FIG. 17 is a cross-sectional view of the second region of the platform having been subjected to finishing.

After that, in S9, as shown in FIGS. 16 and 17, the first and second welding materials 81 and 82 protruding from one surface 62b and the other surface 62c of the platform body 62 are removed, so that the first welded portion 65 made of the first welding material 81 is formed in the first region 71 and the second welded portion 66 made of the second welding material 82 is formed in the second region 72.

One surface 65a flush with one surface 62b of the platform body 62 and the other surface 65b flush with the other surface 62c are formed on the first welded portion 65.

One surface 66a flush with one surface 62b of the platform body 62 and the other surface 66b flush with the other surface 62c are formed on the second welded portion 66.

For example, a grinder can be used in finish machining.

(Thermal Barrier Coating-Forming Step)

After that, a thermal barrier coating 58 is formed on a portion from which the thermal barrier coating 58 has been removed in S5 in S10, so that the repair of the turbine rotor blade 37B is completed and the repaired turbine rotor blade 37B shown in FIGS. 2 and 3 is completed. Then, the processing shown in FIG. 9 ends.

(Effects of Blade Repair Method According to First Embodiment)

Since the first region 71 is overlay-welded using the first welding material 81 having weldability higher than the weldability of the second welding material 82 as described above so that the first region 71, which is positioned close to the blade body 45, of the notched portion 63 is filled, it is possible to suppress the generation of a crack 69 caused by welding work in the first region 71.

A crack 69 to be formed in the platform 47 is formed on the end surface 62a of the platform 47 first, and then grows in the platform 47.

Accordingly, since the second region 72 is overlay-welded using the second welding material 82 having high-temperature strength higher than the high-temperature strength of the first welding material 81 so that the second region 72, which is positioned closer to the end surface 62a of the platform 47 than the first region 71, of the notched portion 63 is filled, it is possible to suppress the generation of a crack 65 in the second welded portion 66 during an operation. Therefore, it is possible to suppress the generation of a crack 69 in the repaired portion during an operation.

Further, since the thickness M1 of the second welded portion 66 (second welding material 82) formed in the second region 72 is excessively small in a case where a range of less than 1.0 mm toward the blade body 45 from the end surface 62a of the platform 47 is set as the second region 72, it is difficult to suppress the generation of a crack 69 in the second welding material 82 during an operation.

Furthermore, since the proportion of a portion made of the second welding material 82 is increased in a case where a range exceeding 3.0 mm toward the blade body 45 from the end surface 62a of the platform 47 is set as the second region 72, a crack 69 caused by welding work frequently occurs as much as that. Accordingly, in a case where a region in the range of 1.0 mm to 3.0 mm toward the blade body 45 from the end surface 62a of the platform 47 is set as the second region 72, it is possible not only to suppress the generation of a crack 69 (not shown) caused by welding work but also to suppress the generation of a crack 69 during an operation.

Further, in a case where a range of 1.5 mm to 2.5 mm toward the blade body 45 from the end surface 62a of the platform 47 is set as the second region 72, it is possible to further suppress the generation of a crack 69 caused by welding work.

Furthermore, in a case where a range of 1.5 mm to 2.0 mm toward the blade body 45 from the end surface 62a of the platform 47 is set as the second region 12, it is possible to further suppress the generation of a crack 69 caused by welding work.

A case where the platform 47 of the turbine rotor blade 37B, which is one of blades, is repaired has been described in the first embodiment by way of example. However, for example, a turbine stator vane 38 where a crack 69 occurs in a shroud may be repaired by the above-mentioned method.

The preferred embodiments of the present disclosure have been described in detail above, but the present disclosure is not limited to such specific embodiments and can have various modifications and changes without departing from the scope of the present disclosure described in claims.

(Additional Notes)

The blade (turbine rotor blade 37B) repair method, the blade (turbine rotor blade 37B), and the gas turbine 10 according to the respective embodiments are grasped, for example, as follows.

(1) A blade (turbine rotor blade 37B) repair method according to a first aspect is a blade repair method of repairing a crack 69 formed in a blade (turbine rotor blade 37B) toward a blade body 45 from an end surface 62a of a platform 47 in a blade width direction Dwp including a direction perpendicular to a blade height direction Dwh. The blade includes the blade body 45 that is disposed in a combustion gas flow channel 41 in which combustion gas flows and has an airfoil shape and the platform 47 that is provided at an end of the blade body 45 in the blade height direction Dwh, extends in the blade width direction Dwp, and partitions a part of an edge of the combustion gas flow channel 41. The blade repair method includes: a notched portion-forming step of forming a notched portion 63, which is recessed toward the blade body 45 from the end surface 62a of the platform 47 and includes a first region 71 positioned close to the blade body 45 and a second region 72 positioned closer to the end surface 62a of the platform 47 than the first region 71, by removing a crack-containing region P, which includes the crack 69, in the platform 47 not yet repaired; a first welding step of filling the first region 71 with a first welding material 81 by overlay welding using the first welding material 81; and a second welding step of filling the second region 72 with a second welding material 82 by overlay welding using the second welding material 82 after the first welding step. High-temperature strength of the second welding material 82 is higher than high-temperature strength of the first welding material 81, weldability of the first welding material 81 is higher than weldability of the second welding material 82, and the second region 72 is a region in a range of 1.0 mm to 3.0 mm toward the blade body 45 from the end surface 62a of the platform 47.

There is generally an incompatibility between the strength of a material and weldability, as the properties of a welding material, and the incompatibility is particularly significant in a case where high-temperature strength is required.

That is, since a welding material having high creep or high high-temperature LCF strength is inferior in weldability, the welding material is likely to crack after welding.

On the other hand, since the high-temperature strength of a material having good weldability is relatively low, the material is less likely to crack after welding.

Further, a large amount of heat needs to be applied to a difficult-to-weld material having low weldability, such as the second welding material 82, during welding. For this reason, a base material is likely to be affected by heat during welding, so that the thermal welding-affected zone (HAZ) is likely to crack.

Since the thickness of the second welding material 82 filling the second region 72 is less than 1.0 mm and the thickness of the second welding material 82 is excessively small in a case where the range of the second region 72 is set to be less than 1.0 mm toward the blade body 45 from the end surface 62a of the platform 47, it is difficult to suppress the generation of a crack 69 caused by the second welding material 82 during an operation.

Further, since the strength of the second welding material 82 against thermal fatigue is higher than that of the first welding material 81 against thermal fatigue, it is desirable that the thickness of the second welding material 82 is increased in terms of structural design in order to ensure sufficient strength against the repetition of thermal stress generated at the end portion of the platform 47 during an operation.

Here, since the thickness of the second welding material 82 is larger than 3.0 mm in a case where the range of the second region 72 is set to be larger than 3.0 mm toward the blade body 45 from the end surface 62a of the platform 47, a portion where a crack 69 caused by welding work is likely to occur in the repaired portion after welding is increased in size and the heat-affected zone 48A in the base material is also increased in size. For this reason, it is not preferable in terms of a welding crack to occur after repair that the range of the second region 72 is set to be larger than 3.0 mm.

Accordingly, in a case where a region in the range of 1.0 mm to 3.0 mm toward the blade body 45 from the end surface 62a of the platform 47 is set as the second region 72, it is possible to suppress the generation of a crack 69 on the end surface 62a of the platform 47 during an operation and to suppress the generation of a crack 69 during welding work.

(2) According to a second aspect, in the blade (turbine rotor blade 37B) repair method according to (1), a connecting portion between the blade body 45 and the platform 47 may form a fillet portion 48 along which the combustion gas flows, a surface 48a of the fillet portion 48 may be formed of a curved surface that allows a gas path surface 47a of the platform 47 partitioning the part of the edge of the combustion gas flow channel 41 to gradually become a blade surface of the blade body 45, an end, which is disposed close to the blade body 45, of both ends of the fillet portion 48 in the blade width direction Dwp may be a trailing end 48E of the fillet portion 48, and, in a case where a width of a heat-affected zone 48A, which is affected by heat during the overlay welding of the first welding material 81, is defined as a heat-affected width W1, the first and second welding steps may be performed when a distance N1 between a tip 69A of the crack 69 closest to the blade body 45 and the trailing end 48E of the fillet portion 43 is larger than the heat-affected width W1.

Since repair processing (processing including the first and second welding steps) is performed in a case where the distance N1 between the tip 69A of the crack 69 closest to the blade body 45 and the trailing end 48E of the fillet portion 48 is larger than the heat-affected width W1 as described above, the formation of the heat-affected zone 48A in the blade body 43 can be suppressed. Accordingly, the repaired blade (turbine rotor blade 37B) can be reused.

(3) According to a third aspect, in the blade (turbine rotor blade 37B) repair method according to (2), the heat-affected width W1 may be 3 mm.

As described above, the heat-affected width W1 can be set to 3 mm.

(4) According to a fourth aspect, in the blade (turbine rotor blade 37B) repair method according to any one of (1) to (3), in the notched port ion-forming step, a penetrating portion 74 that removes the crack 69 by penetrating the platform 47 in a thickness direction of the platform 47 and a non-penetrating portion 75 that does not penetrate the platform 47 may be formed in the first region 71.

Since the non-penetrating portion 75 that does not penetrate the platform 47 is formed in the first region 71 as described above, the non-penetrating portion 75 can be made to function as a support for supporting the melted first welding material 81 in a case where the first region 71 is over lay-welded using the first welding material 81. Accordingly, it is possible to easily perform overlay welding using the first welding material 81.

(5) According to a fifth aspect, in the blade (turbine rotor blade 37B) repair method according to any one of (1) to (4), in the first welding step, the overlay welding of the first welding material 81 may be performed in a state where a tip 63A of the notched portion 63 positioned close to the blade body 45 faces downward, and in the second welding step, the overlay welding of the second welding material 82 may be performed in a state where the tip 63A of the notched portion 63 positioned close to the blade body 45 faces downward.

Since the overlay welding of the first welding material 81 is performed in a state where the tip 63A of the notched portion 63 positioned close to the blade body 45 faces downward as described above, the tip 63A of the notched portion 63 can be made to function as a support surface for supporting the first welding material 81. Accordingly, it is possible to easily perform the first welding step.

Further, since the overlay welding of the second welding material 82 is performed in a state where the tip 63A of the notched portion 63 positioned close to the blade body 45 faces downward, the end surface of the first welding material 81 can be made to function as a support for supporting the second welding material 82. Accordingly, it is possible to easily perform the second welding step.

(6) A blade (turbine rotor blade 37B) according to a sixth aspect is a blade (turbine rotor blade 37B) including: a blade body 45 that is disposed in a combustion gas flow channel 41 in which combustion gas flows and has an airfoil shape; and a platform 47 that is provided at an end of the blade body 45 in a blade height direction Dwh, extends in a blade width direction Dwp including a direction perpendicular to the blade height direction Dwh, and partitions a part of an edge of the combustion gas flow channel 41. The platform 47 includes: a notched portion 63, which is recessed toward the blade body 45 from an end surface 62a of the platform 47 and includes a first region 71 positioned close to the blade body 45 and a second region 72 positioned closer to the end surface 62a of the platform 47 than the first region 71, formed by removing a crack-containing region P in which a crack 69 occurs; a first welded portion 65 that is disposed to fill the first region 71 and is made of a first welding material 81; and a second welded portion 66 that is disposed to fill the second region 72 and is made of a second welding material 82. High-temperature strength of the second welding material 82 is higher than high-temperature strength of the first welding material 81. Weldability of the first welding material 81 is higher than weldability of the second welding material 82. In a case where an end surface (one end surface 66c) of the second welded portion 66 disposed close to the end surface 62a of the platform 47 is used as a reference, a thickness M1 of the second welded portion 66 in a direction toward the blade body 45 from the end surface (one end surface 66c) of the second welded portion 66 is in a range of 1.0 mm to 3.0 mm.

There is generally an incompatibility between the strength of a material and weldability, as the properties of a welding material, and the incompatibility is particularly significant in a case where high-temperature strength is required.

That is, since a welding material having high creep or high high-temperature LCF strength is inferior in weldability, the welding material is likely to crack after welding.

On the other hand, since the high-temperature strength of a material having good weldability is relatively low, the material is less likely to crack after welding.

Further, a large amount of heat needs to be applied to a difficult-to-weld material having low weldability, such as the second welding material 82, during welding. For this reason, a base material is likely to be affected by heat during welding, so that the thermal welding-affected zone (HAZ) is likely to crack.

Since the thickness M1 of the second welded portion 66 is excessively small in a case where the thickness M1 of the second welded portion 66 made of the second welding material 82 is set to be less than 1.0 mm, it is difficult to suppress the generation of a crack 69 caused by the second welded portion 66 during an operation.

Further, since the strength of the second welding material 82 against thermal fatigue is higher than that of the first welding material 81 against thermal fatigue, it is desirable that the thickness M1 or the second welded portion 66 is increased in terms of structural design in order to ensure sufficient strength against the repetition of thermal stress generated at the end portion of the platform 47 during an operation.

Here, in a case where the thickness M1 of the second welded portion 66 is set to be larger than 3.0 mm, a portion where a crack 69 caused by welding work is likely to occur in the repaired portion after welding is increased in size and the heat-affected zone 48A in the base material is also increased in size. For this reason, it is not preferable in terms of a welding crack to occur after repair that the thickness M1 of the second welded portion 66 is set to be larger than 3.0 mm.

Accordingly, in a case where the thickness M1 of the second welded portion 66 is set in the range of 1.0 mm to 3.0 mm, it is possible to suppress the generation of a crack 69 on the end surface 62a of the platform 47 during an operation and to suppress the generation of a crack 69 during welding work.

(7) According to a seventh aspect, in the blade (turbine rotor blade 37B) according to (6), the first region 71 may include a penetrating portion 74 that penetrates the platform 47 in a thickness direction of the platform 47 and a non-penetrating portion 75 that does not penetrate the platform 47, and the penetrating portion 74 may be formed to remove a position at which the crack 69 is forced.

Since the first region 71 includes the non-penetrating portion 75 that does not penetrate the platform 47 as described above, the non-penetrating portion 75 can be made to function as a support for supporting the melted first welding material 81 in a case where the first region 71 is overlay-welded using the first welding material 81. Accordingly, it is possible to easily perform overlay welding using the first welding material 81.

(8) According to an eighth aspect, in the blade (turbine rotor blade 37B) according to (6) or (7), a connecting portion between the blade body 45 and the platform 47 may form a fillet portion 48 along which the combustion gas flows, a surface of the fillet portion 48 may be formed of a curved surface that allows a gas path surface 47a of the platform 47 partitioning the part of the edge of the combustion gas flow channel 41 to gradually become a blade surface of the blade body 45, an end, which is disposed close to the blade body 45, of both ends of the fillet portion 48 in the blade width direction Dwp may be a trailing end 48E of the fillet portion 48, the fillet portion 48 may include a heat-affected zone 48A that is formed by being affected by heat during overlay welding of the first welding material 81, and the heat-affected zone 48A may be disposed closer to the end surface 62a of the platform 47 than the trailing end 48E of the fillet portion 48.

Since the heat-affected zone 48A is disposed closer to end surface 62a of the platform 47 than the trailing end 48E of the fillet portion 48 as described above, it is possible to suppress the formation of the heat-affected zone 48A in the blade body 45. Accordingly, it is possible to suppress the deterioration of the performance of the blade body 45 that is caused by the heat-affected zone 48A.

(9) A gas turbine 10 according to a ninth aspect includes a turbine rotor blade (37B) and/or a turbine stator vane (38) as the blade (turbine rotor blade 37B) according to any one of (6) to (3).

As described above, the gas turbine 10 may include the turbine rotor blade (37B) and/or the turbine stator vane (38) as the blade.

INDUSTRIAL APPLICABILITY

The present invention relates to a blade repair method, a blade, and a gas turbine.

According to the present invention, it is possible to suppress the generation of a crack on an end surface of a platform of a blade during an operation and the generation of a crack during welding work.

REFERENCE SIGNS LIST

10: gas turbine
11: compressor
12: combustor
13: turbine
15: generator
21: compressor rotor
21a, 31a: outer peripheral surface
23: compressor rotor blade stage
24: compressor casing
24a, 34a: inner peripheral surface
25: compressor stator vane stage
27: compressor rotor blade
28: compressor stator vane
30: rotor
31: turbine rotor
33: turbine rotor blade stage
34: turbine casing
35: turbine stator vane stage
37, 37A, 37B: turbine rotor blade
38: turbine stator vane
41: combustion gas flow channel
45: blade body
45A: leading edge
45B: trailing edge
47: platform
47a: gas path surface
48: fillet portion
48A: heat-affected zone
48E: trailing end
48S: starting end
49: shaft attachment portion
51: pressure surface-side blade wall
51a: pressure surface
52: suction surface-side blade wall
52a: suction surface 54: top plate
57: metal preform
58: thermal barrier coating
62: platform body
62a: end surface
62b, 65a, 66a: one surface
62c, 65b, 66b: the other surface
63: notched portion
63A, 69A: tip
65: first welded portion
66: second welded portion
66c: one end surface
66d: the other end surface
69: crack
71: first region
72: second region
74: penetrating portion
75: non-penetrating portion
81: first welding material
82: second welding material
85: shank
86: blade root
Ar: axis
Dc: circumferential direction
Dr: radial direction
Dri: radial inner side
Dro: radial outer side
Dwp: blade width direction
Dwh: blade height direction
L1, L2: length
M1: thickness
N1: distance
P: crack-containing region
W1: heat-affected width

The invention claimed is:

1. A blade repair method of repairing a crack formed in a blade toward a blade body from an end surface of a platform in a blade width direction including a direction perpendicular to a blade height direction, the blade including the blade body that is disposed in a combustion gas flow channel in which combustion gas flows and has an airfoil shape and the platform that is provided at an end of the blade body in the blade height direction, extends in the blade width direction, and partitions a part of an edge of the combustion gas flow channel, the blade repair method comprising:
 a notched portion-forming step of forming a notched portion, which is recessed toward the blade body from the end surface of the platform and includes a first region positioned close to the blade body and a second region positioned closer to the end surface of the platform than the first region, by removing a crack-containing region, which includes the crack, in the platform not yet repaired;
 a first welding step of filling the first region with a first welding material by overlay welding using the first welding material; and
 a second welding step of filling the second region with a second welding material by overlay welding using the second welding material after the first welding step,
 wherein high-temperature strength of the second welding material is higher than high-temperature strength of the first welding material,
 weldability of the first welding material is higher than weldability of the second welding material,
 the second region is a region in a range of 1.0 mm to 3.0 mm toward the blade body from the end surface of the platform,
 a connecting portion between the blade body and the platform forms a fillet portion along which the combustion gas flows, and
 a surface of the fillet portion is formed of a curved surface that allows a gas path surface of the platform partitioning the part of the edge of the combustion gas flow channel to gradually become a blade surface of the blade body,
 an end, which is disposed close to the blade body, of both ends of the fillet portion in the blade width direction is a trailing end of the fillet portion, and
 in a case where a width of a heat-affected zone, which is affected by heat during the overlay welding of the first welding material, is defined as a heat-affected width, the first and second welding steps are performed when a distance between a tip of the crack closest to the blade body and the trailing end of the fillet portion is larger than the heat-affected width.

2. The blade repair method according to claim 1, wherein the heat-affected width is 3 mm.

3. A blade repair method of repairing a crack formed in a blade toward a blade body from an end surface of a platform in a blade width direction including a direction perpendicular to a blade height direction, the blade including the blade body that is disposed in a combustion gas flow channel in which combustion gas flows and has an airfoil shape and the platform that is provided at an end of the blade body in the blade height direction, extends in the blade width direction, and partitions a part of an edge of the combustion gas flow channel, the blade repair method comprising:
 a notched portion-forming step of forming a notched portion, which is recessed toward the blade body from the end surface of the platform and includes a first region positioned close to the blade body and a second region positioned closer to the end surface of the platform than the first region, by removing a crack-containing region, which includes the crack, in the platform not yet repaired;
 a first welding step of filling the first region with a first welding material by overlay welding using the first welding material; and
 a second welding step of filling the second region with a second welding material by overlay welding using the second welding material after the first welding step,
 wherein high-temperature strength of the second welding material is higher than high-temperature strength of the first welding material,
 weldability of the first welding material is higher than weldability of the second welding material,
 the second region is a region in a range of 1.0 mm to 3.0 mm toward the blade body from the end surface of the platform, and
 in the notched portion-forming step, a penetrating portion that removes the crack by penetrating the platform in a thickness direction of the platform and a non-penetrating portion that does not penetrate the platform are formed in the first region.

4. A blade repair method of repairing a crack formed in a blade toward a blade body from an end surface of a platform in a blade width direction including a direction perpendicular to a blade height direction, the blade including the blade body that is disposed in a combustion gas flow channel in which combustion gas flows and has an airfoil shape and the platform that is provided at an end of the blade body in the blade height direction, extends in the blade width direction, and partitions a part of an edge of the combustion gas flow channel, the blade repair method comprising:

a notched portion-forming step of forming a notched portion, which is recessed toward the blade body from the end surface of the platform and includes a first region positioned close to the blade body and a second region positioned closer to the end surface of the platform than the first region, by removing a crack-containing region, which includes the crack, in the platform not yet repaired;

a first welding step of filling the first region with a first welding material by overlay welding using the first welding material; and a second welding step of filling the second region with a second welding material by overlay welding using the second welding material after the first welding step, wherein high-temperature strength of the second welding material is higher than high-temperature strength of the first welding material, weldability of the first welding material is higher than weldability of the second welding material, the second region is a region in a range of 1.0 mm to 3.0 mm toward the blade body from the end surface of the platform, in the first welding step, the overlay welding of the first welding material is performed in a state where a tip of the notched portion positioned close to the blade body faces downward, and in the second welding step, the overlay welding of the second welding material is performed in a state where the tip of the notched portion positioned close to the blade body faces downward.

5. A blade comprising:

a blade body that is disposed in a combustion gas flow channel in which combustion gas flows and has an airfoil shape; and a platform that is provided at an end of the blade body in a blade height direction, extends in a blade width direction including a direction perpendicular to the blade height direction, and partitions a part of an edge of the combustion gas flow channel, wherein the platform includes:

a notched portion, which is recessed toward the blade body from an end surface of the platform and includes a first region positioned close to the blade body and a second region positioned closer to the end surface of the platform than the first region, formed by removing a crack-containing region in which a crack, occurs;

a first welded portion that is disposed to fill the first region and is made of a first welding material; and a second welded portion that is disposed to fill the second region and is made of a second welding material, wherein high-temperature strength of the second welding material is higher than high-temperature strength of the first welding material, weldability of the first welding material is higher than weldability of the second welding material, in a case where an end surface of the second welded portion disposed close to the end surface of the platform is used as a reference, a thickness of the second welded portion in a direction toward the blade body from the end surface of the second welded portion is in a range of 1.0 mm to 3.0 mm, the first region includes a penetrating portion that penetrates the platform in a thickness direction of the platform and a non-penetrating portion that does not penetrate the platform, and the penetrating portion is formed to remove a position at which the crack is formed.

6. The blade according to claim 5, wherein a connecting portion between the blade body and the platform forms a fillet portion along which the combustion gas flows, a surface of the fillet portion is formed of a curved surface that allows a gas path surface of the platform partitioning the part of the edge of the combustion gas flow channel to gradually become a blade surface of the blade body, an end, which is disposed close to the blade body, of both ends of the fillet portion in the blade width direction is a trailing end of the fillet portion, the fillet portion includes a heat-affected zone that is formed by being affected by heat during overlay welding of the first welding material, and the heat-affected zone is disposed closer to the end surface of the platform than the trailing end of the fillet portion.

7. A gas turbine comprising:

a turbine rotor blade and/or a turbine stator vane as the blade according to claim 5.

* * * * *